US009830551B2

(12) United States Patent
Wang (10) Patent No.: US 9,830,551 B2
(45) Date of Patent: Nov. 28, 2017

(54) CHIP CARD ASSEMBLING STRUCTURE AND METHOD THEREOF

(71) Applicant: A-MEN TECHNOLOGY CORPORATION, New Taipei (TW)

(72) Inventor: Pen-Lo Wang, New Taipei (TW)

(73) Assignee: ABANCAST LIMITED, Tortola (VG)

( * ) Notice: Subject to any disclaimer, the term of this patent is extended or adjusted under 35 U.S.C. 154(b) by 223 days.

(21) Appl. No.: 14/681,109

(22) Filed: Apr. 8, 2015

(65) Prior Publication Data

US 2015/0213354 A1     Jul. 30, 2015

Related U.S. Application Data

(62) Division of application No. 13/958,609, filed on Aug. 5, 2013, now Pat. No. 9,195,929.

(51) Int. Cl.
  *B32B 3/24* (2006.01)
  *G06K 19/077* (2006.01)
  *H04B 1/3816* (2015.01)

(52) U.S. Cl.
  CPC ...... *G06K 19/07739* (2013.01); *H04B 1/3816* (2013.01); *Y10T 156/17* (2015.01)

(58) Field of Classification Search
  CPC .................................................. G06K 19/07739
  USPC .......................................................... 235/487
  See application file for complete search history.

(56) References Cited

U.S. PATENT DOCUMENTS 9,016,590 B2 * 4/2015 Tarantino ......... G06K 19/07722
                                                              235/487

* cited by examiner

*Primary Examiner* — William P Watkins, III
(74) *Attorney, Agent, or Firm* — Leong C. Lei (57) ABSTRACT

Disclosed are a chip card assembling structure and a method thereof, including at least one base plate, at least one fixing element having a side forming a fixing trough corresponding to the base plate, at least one adhesive film disposed on one side of the fixing element to cover the fixing trough, and at least one thin-film chip received in the fixing trough and bonded to the adhesive film. To use the present invention, the adhesive film, together with the thin-film chip, is lifted and the base plate is placed into the fixing trough, following setting the adhesive film and the thin-film chip back to have the thin-film chip coupled to the base plate. Then, the adhesive film is lifted to remove the coupled thin-film chip and base plate, so that the relative position between the thin-film chip and the base plate is precise and correct.

3 Claims, 8 Drawing Sheets

CHIP CARD ASSEMBLING STRUCTURE AND METHOD THEREOF

CROSS-REFERENCE TO RELATED APPLICATION

This is a division of the co-pending patent application Ser. No. 13/958,609, filed Aug. 5, 2013.

(a) TECHNICAL FIELD OF THE INVENTION

The present invention generally relates to a chip card, and more particularly to a chip card assembling structure that allows unconstrained application and reduces manufacture cost and a method thereof.

(b) DESCRIPTION OF THE PRIOR ART

A conventional chip card generally comprises a carrier plate and a chip module that are manufactured separately. In a manufacturing process, a recess is first formed in one side of the carrier plate and then, the chip module is fit into or embedded in the recess to complete the manufacture. This process is complicated and time-consuming.

The chip cards that are currently available in the market are divided into three types, including a regular SIM card, a micro SIM card, and a nano SIM card, of which the sizes and dimensions are different. In manufacturing a conventional chip card, each time a specific size of the carrier plate and chip module is manufactured and then assembled individually, so that the manufacture cost is high. Further, the application or use of the conventional chip cards is constrained by the size and dimension thereof. In addition, inventory cost is also high.

It is thus a challenge for the manufacturers of the field and the present inventor to overcome the above-discussed problems and drawbacks.

SUMMARY OF THE INVENTION

In view of the above problems, through intense research and study of related information, as well as repeated trials and improvements, an invention related to a chip card assembling structure that allows unconstrained application and reduces manufacture cost and a method thereof are accomplished.

The primary object of the present invention is to use with various sizes and specifications.

Another object of the present invention is to reduce the cost required for manufacture.

To achieve the above objects, the present invention comprises at least a base plate and at least a fixing element. The fixing element has at least a side forming at least a fixing trough corresponding to the base plate. At least one adhesive film is disposed on one side of the fixing element to cover the fixing trough. At least one thin-film chip received in the fixing trough and bonded to the adhesive film. To use the present invention, the adhesive film is lifted to lift up the thin-film chip. The base plate is placed into the fixing trough to have the base plate fixed. The adhesive film is set back to have the thin-film chip move toward the fixing trough so that the thin-film chip can be coupled to the base plate. The adhesive film is lifted again to remove the coupled thin-film chip and base plate, so that the position where the thin-film chip is set is precise and correct. With the above-described technique, the problems that the application of a conventional film-attached chip card is constrained and the manufacture cost is relatively high can be overcome to achieve a practical advantage of unconstrained application and saving of manufacture cost.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-4, which are respectively a perspective view and an exploded view of a preferred embodiment of the present invention, a schematic view of a thin-film chip of the preferred embodiment of the present invention, a schematic view of a fixing element of the preferred embodiment of the present invention, the drawings clearly show that the present invention comprises at least one base plate 1, at least one fixing element 3, at least one adhesive film 4, and at least one thin-film chip 2. In the instant embodiment, explanation will be given with reference to three different sizes specified for a regular SIM card, a micro SIM card, and a nano SIM card. The fixing element 3 comprises, formed in at least one side thereof, at least one fixing trough 31 corresponding to the base plate 1. The fixing trough 31 is divided into a first fixing trough 311 (of which the size corresponds to that of a regular SIM card), a second fixing trough 312 (of which the size corresponds to that of a micro SIM), and a third fixing trough 313 (of which the size corresponds to that of a nano SIM card). Further, trough bottoms of the first fixing trough 311, the second fixing trough 312, and the third fixing trough 313 are arranged to have different distances from a side wall of the base plate 1. The adhesive film 4 is set on one side of the fixing element 3 to cover the fixing trough 31. The adhesive film 4 has a side that is adjacent to the fixing element 3 and forms at least one sticky portion 41. The sticky portion 41 is repeatedly attachable. The thin-film chip 2 is set in the fixing trough 31 and is bonded to the adhesive film 4. The thin-film chip 2 has a side that is adjacent to the adhesive film 4 and comprises a contact interface assembly 21 and an opposite side forming at least one coupling section 22 for coupling to the base plate 1. The coupling section 22 comprises at least one separator sheet 221 mounted thereto. The thin-film chip 2 comprises at least one dividable section 23 that corresponds to the base plate 1 and is detachable. The dividable section 23 has an outer perimeter having a size corresponding to the micro SIM. The dividable section 23 has an inner perimeter having a size corresponding to the nano SIM card. Further, the above description is given to only one possible configuration of the present invention, and other configurations are also available.

Referring to FIGS. 1-8, which are respectively a perspective view and an exploded view of a preferred embodiment of the present invention, a schematic view of a thin-film chip of the preferred embodiment of the present invention, a schematic view of a fixing element of the preferred embodiment of the present invention, three schematic view illustrating assembling of the preferred embodiment of the present invention, and a schematic view illustrating disassembling of the preferred embodiment of the present invention, these drawings clearly show that to use the present invention, the adhesive film 4 is first partially peeled off to expose the fixing trough 31. The adhesive film 4 uses the sticky portion 41 to lift the thin-film chip 2 so as to remove the thin-film chip 2 out of the fixing trough 31. The separator sheet 221 is then peeled off to expose the coupling section 22 and the base plate 1 is placed and fixed in one of the first fixing trough 311, the second fixing trough 312, and the third fixing trough 313 according to the size thereof. The adhesive film 4 is bonded back to have the coupling section 22 of the thin-film chip 2 coupled to the base plate 1. The adhesive film 4 is partially peeled off again to remove the coupled thin-film chip 2 and base plate 1. When the size of the base plate 1 is that of a regular SIM card or a micro SIM card, the assembling of the chip card is completed according to the present invention.

Figure 1:
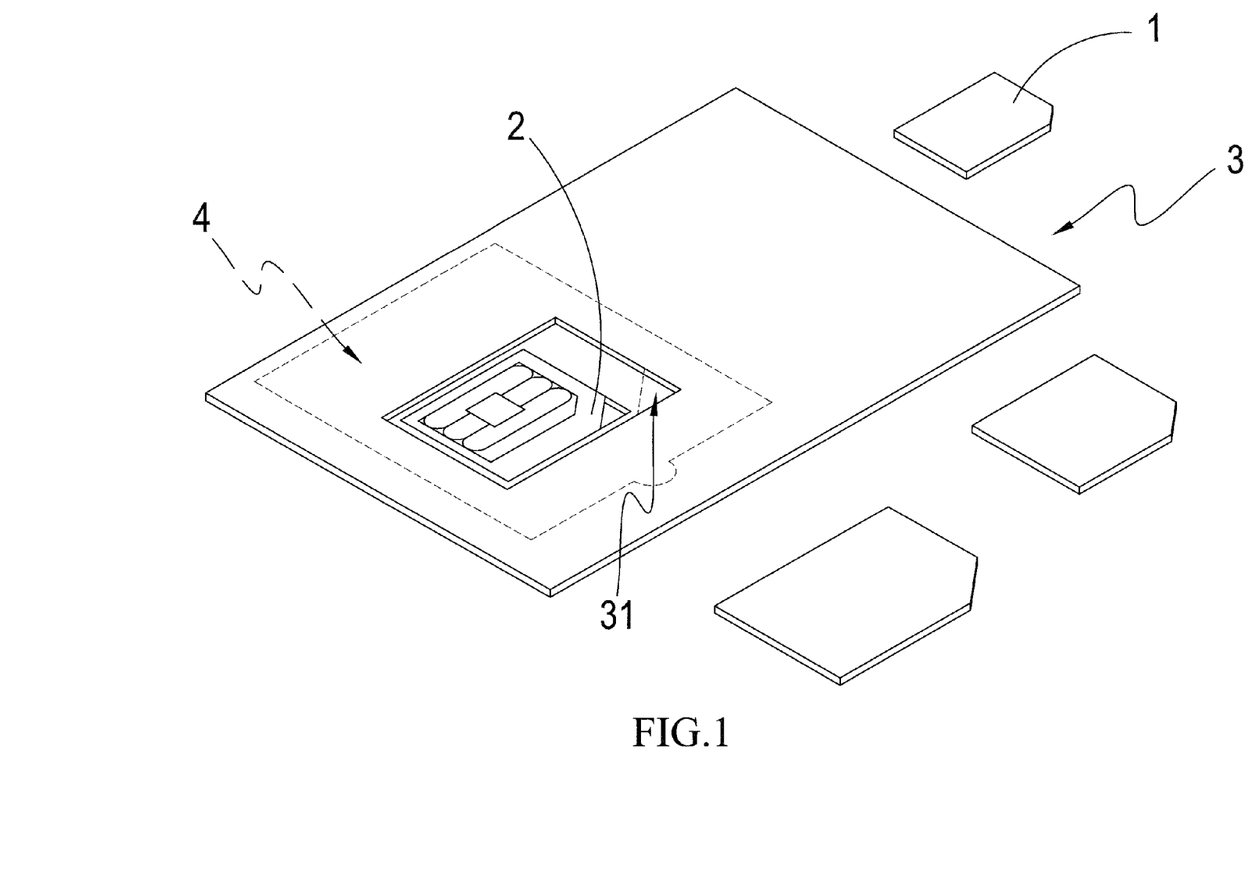
FIG. 1 is a perspective view illustrating a preferred embodiment of the present invention.
Figure 2:
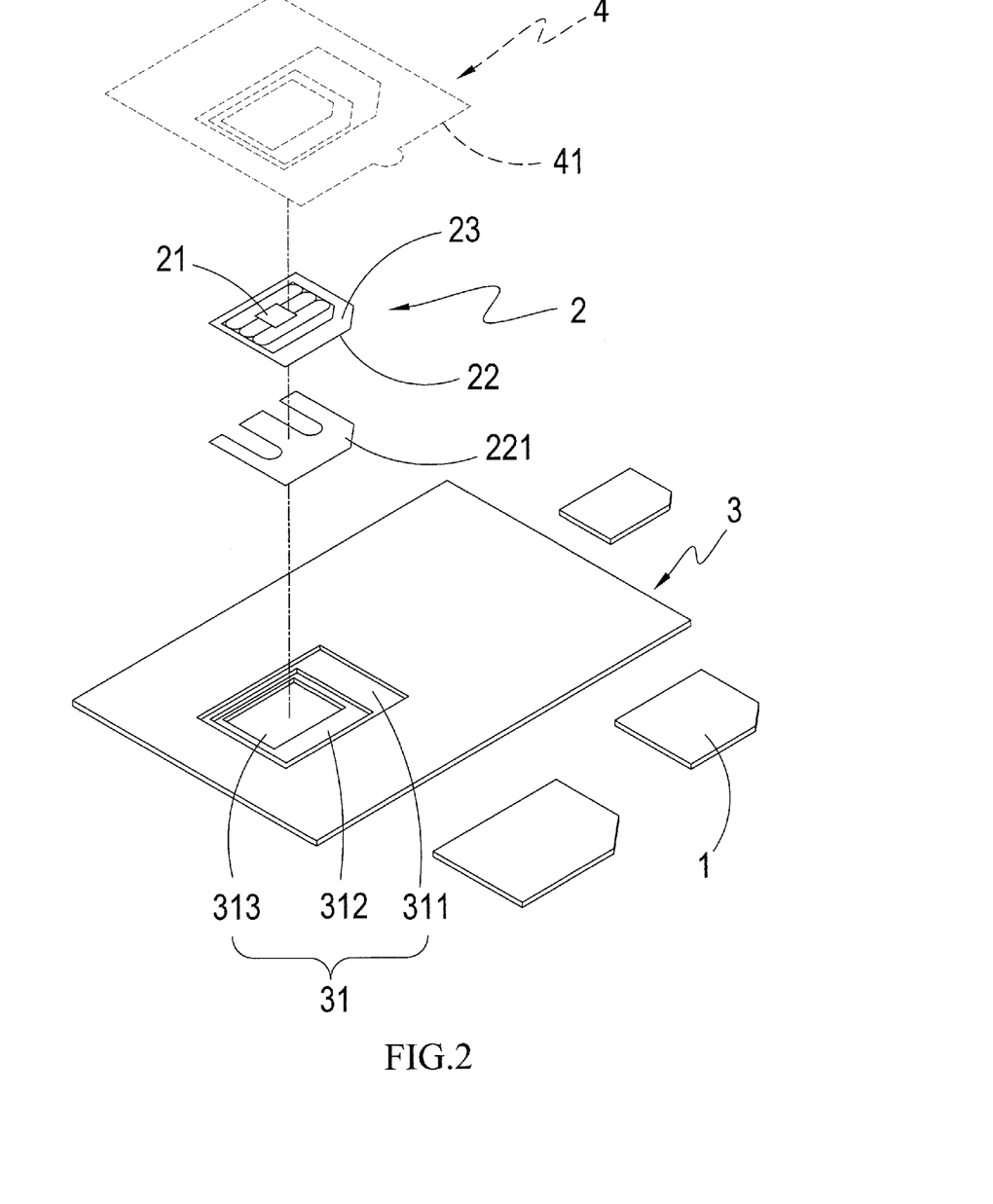
FIG. 2 is an exploded view of the preferred embodiment of the present invention.
Figure 3:
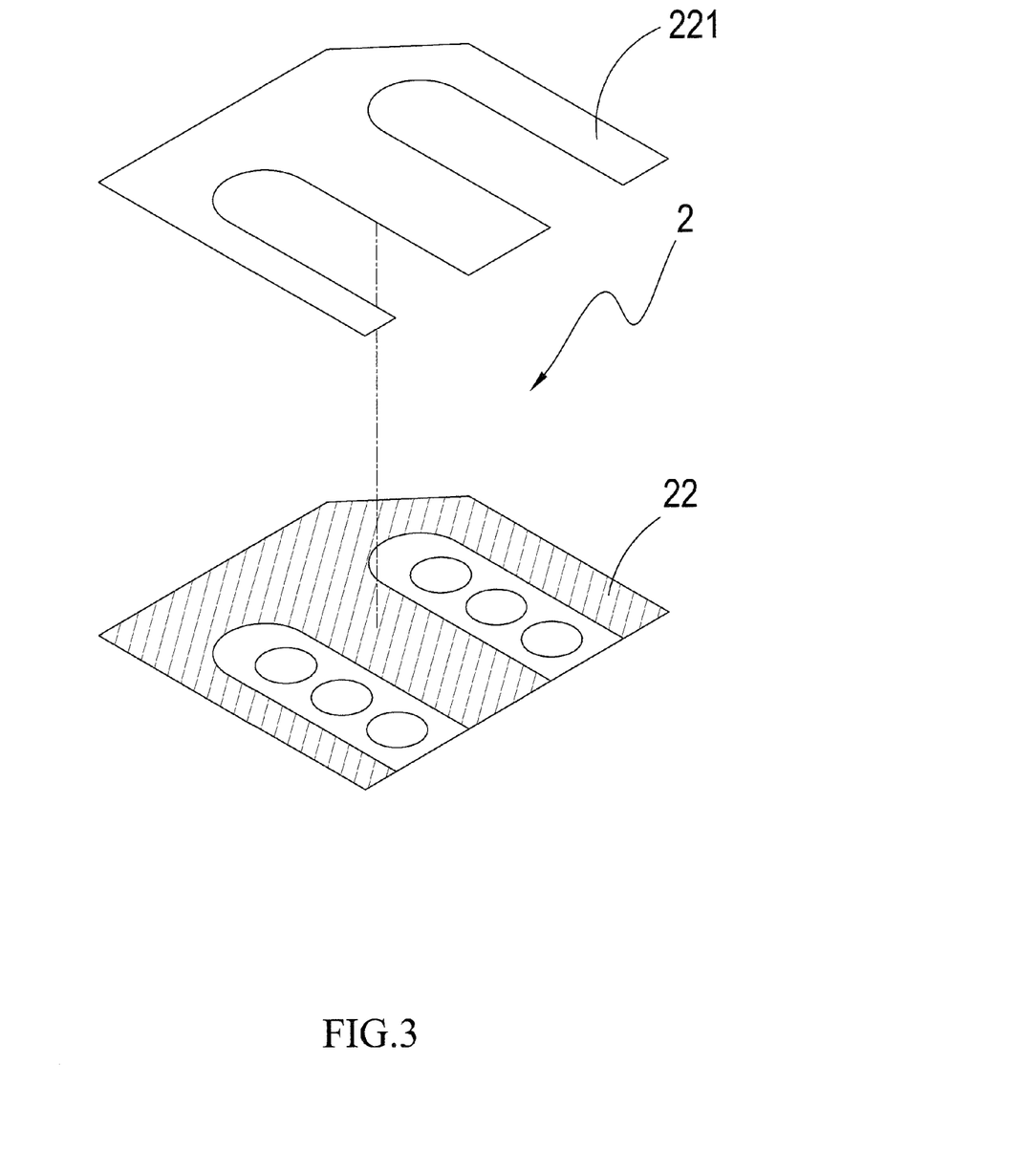
FIG. 3 is a perspective view showing a thin-film chip according to the preferred embodiment of the present invention.
Figure 4:
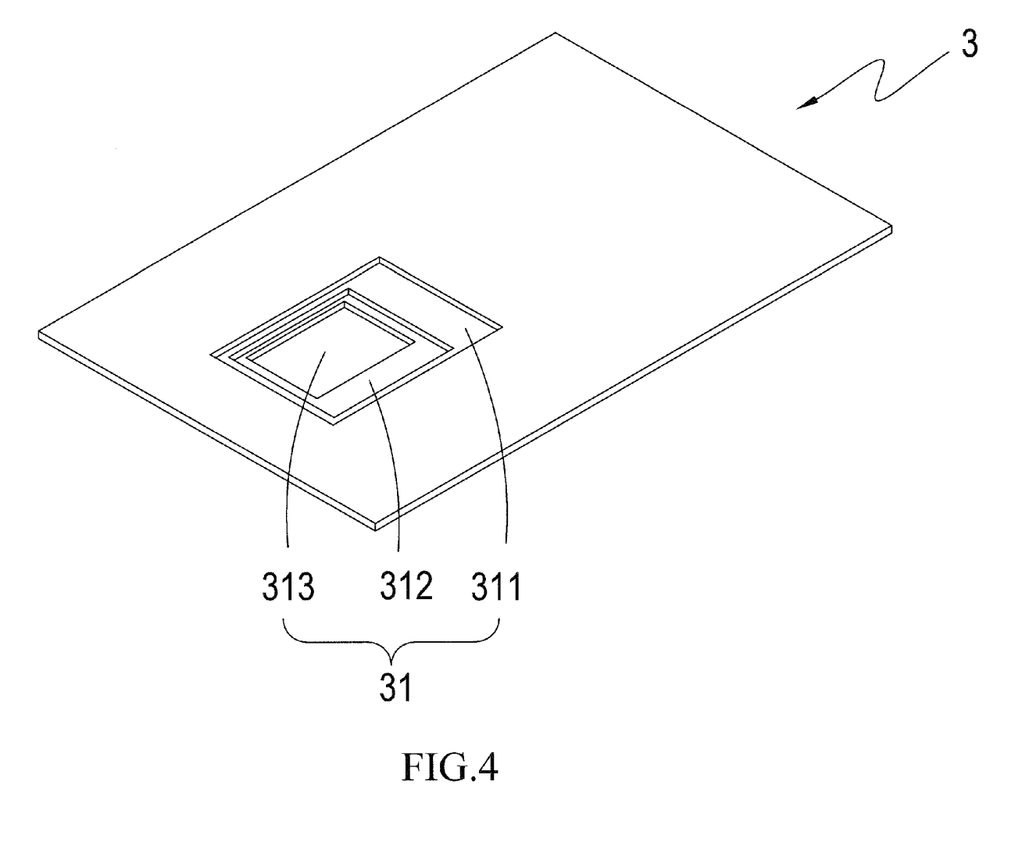
FIG. 4 is a schematic view showing a fixing element according to the preferred embodiment of the present invention.
Figure 5:
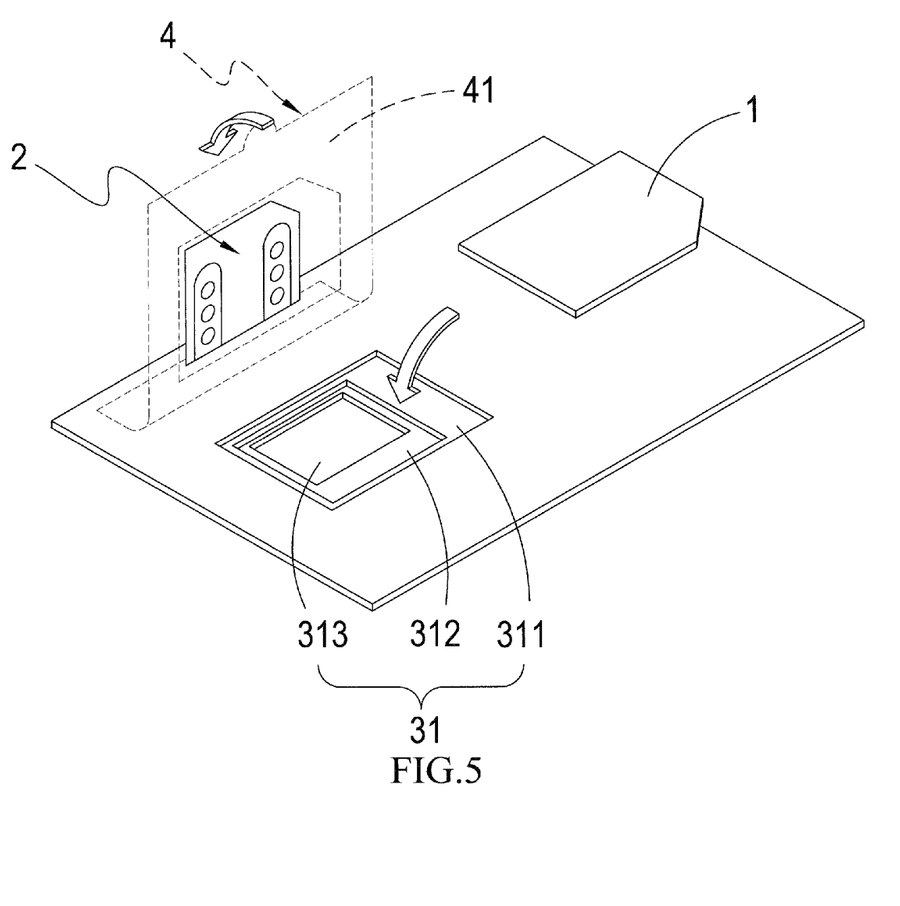
FIG. 5 is a schematic view illustrating assembling of the preferred embodiment of the present invention.
Figure 6:
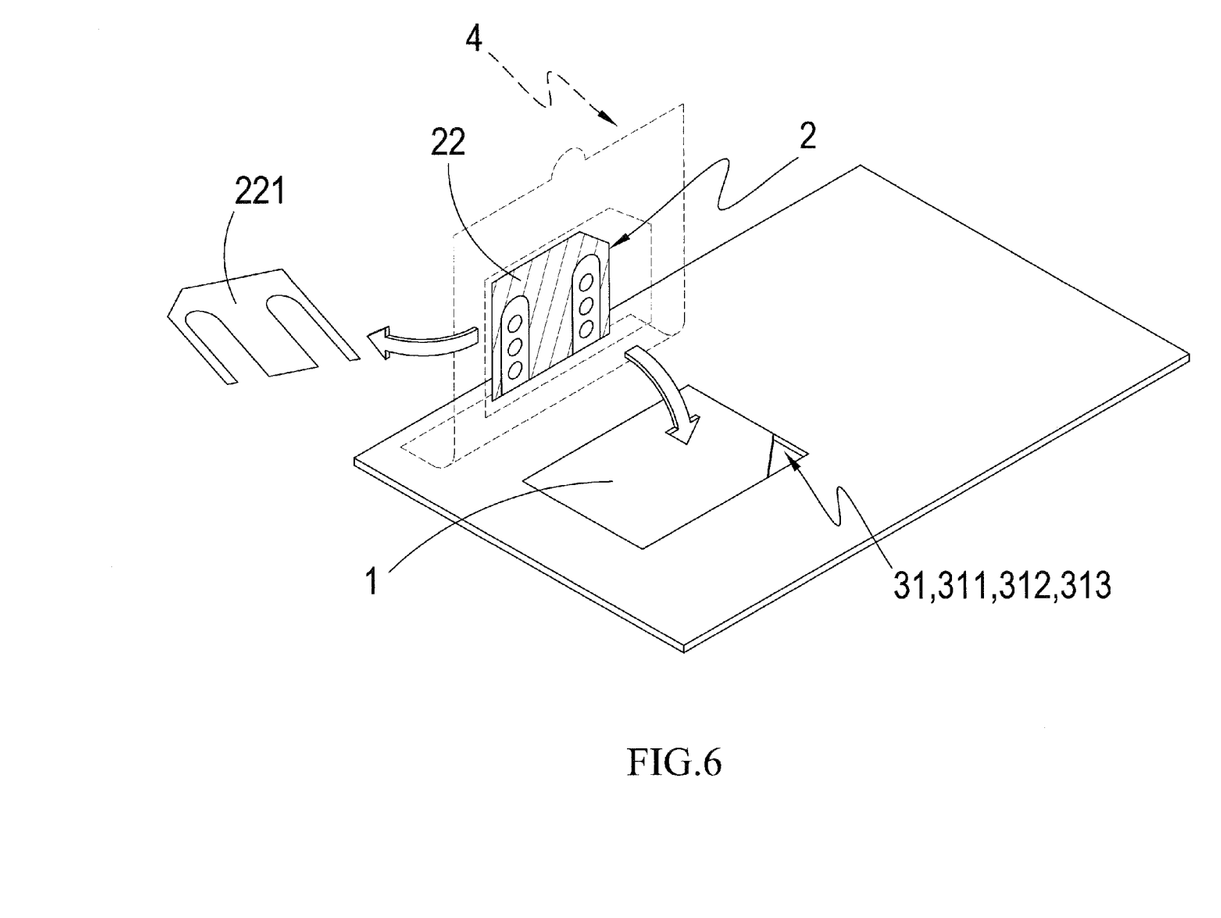
FIG. 6 is another schematic view illustrating assembling of the preferred embodiment of the present invention.
Figure 7:
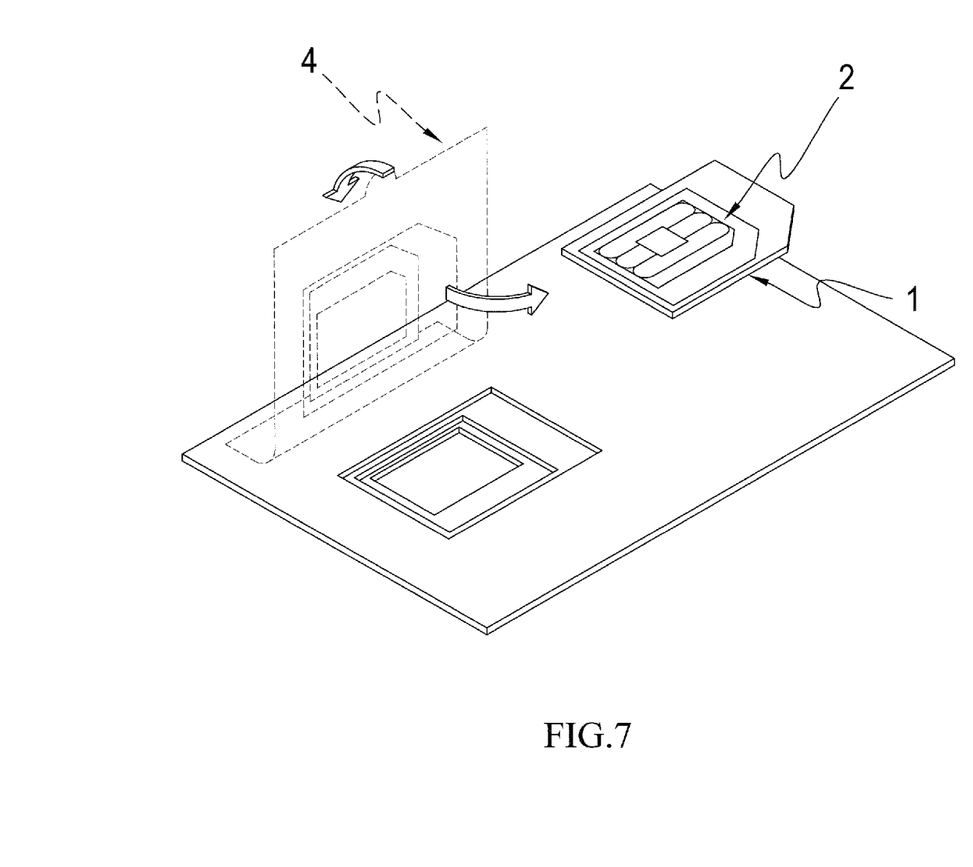
FIG. 7 is a further schematic view illustrating assembling of the preferred embodiment of the present invention.
Figure 8:
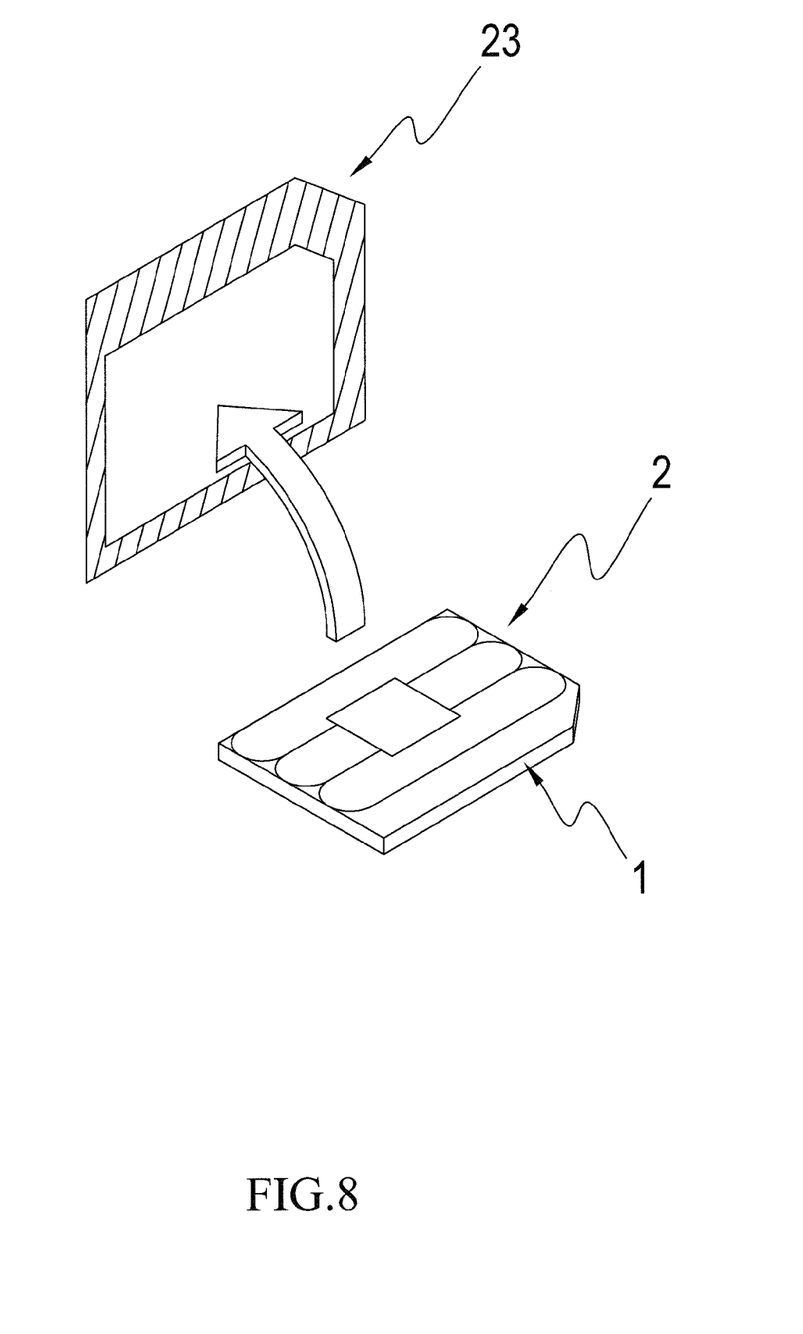
FIG. 8 is a schematic view illustrating disassembling of the preferred embodiment of the present invention.

Further, when the base plate 1 has a size that is the size of a nano SIM card, the dividable section 23 is detached and removed from the thin-film chip 2 to complete the assembling of the chip card according to the present invention (as shown in FIG. 8).

Thus, the chip card assembling structure and the method thereof according to the present invention provide the following features that improve the known techniques:

(1) The collaborative arrangement of the base plate 1 and the adhesive film 4 and that of the thin-film chip 2 and the base plate 1 provide the availability for manufacture of different sizes, specifications, and individuals so that the present invention may achieve a practical advantage of unconstrained application and reduction of manufacture cost.

(2) The detachability of the dividable section 23 from the thin-film chip 2 provides the availability for manufacture of different sizes, specifications, and individuals so that the present invention may achieve a practical advantage of unconstrained application and reduction of manufacture cost.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An e chip card assembling structure, comprising:

at least one base plate;

at least one fixing element, the fixing element having at least one side in which at least one fixing trough is formed to correspond to the base plate;

at least one adhesive film, the adhesive film being disposed on a side of the fixing element to cover the fixing trough; and at least one thin-film chip, the thin-film chip being received in the fixing trough and bonded to the adhesive film, wherein the thin-film chip has a side that is adjacent to the adhesive film and comprises a contact interface assembly and an opposite side that comprises at least one coupling section for coupling with the base plate, the coupling section comprising at least one separator sheet; and wherein the thin-film chip comprises at least one dividable section that corresponds to the base plate and is detachable so that the at least one dividable section is selectively removable from the thin-film chip.

2. The e chip card assembling structure according to claim 1, wherein the fixing trough is divided into a first fixing trough, a second fixing trough, and a third fixing trough, the first fixing trough, the second fixing trough, and the third fixing trough having trough bottoms that are at different distances from a side of the base plate.

3. The e chip card assembling structure according to claim 1, wherein the adhesive film has a side that is adjacent to the fixing element and comprises at least one sticky portion, the sticky portion being repeatedly attachable.

* * * * *